US005504881A

United States Patent [19]

Sirurget

[11] Patent Number: 5,504,881

[45] Date of Patent: Apr. 2, 1996

[54] METHOD FOR TESTING AND VALIDATING THE PRIMITIVES OF A REAL-TIME EXECUTIVE BY ACTIVATING COOPERATING TASK USING THESE PRIMITIVES

[75] Inventor: Benoit Sirurget, Chaville, France

[73] Assignee: Sextant Avionique, Meudon La Foret, France

[21] Appl. No.: 982,554

[22] Filed: Nov. 27, 1992

[30] Foreign Application Priority Data

Nov. 29, 1991 [FR] France .................................. 91 15107

[51] Int. Cl.[6] ............................ G01F 11/00; G01F 11/30

[52] U.S. Cl. ........................................................ 395/183.14

[58] Field of Search ........................... 395/575; 371/16.1, 371/15.1, 19

[56] References Cited

U.S. PATENT DOCUMENTS

| | | | |
|---|---|---|---|
| 5,027,291 | 6/1991 | Callahan et al. | 364/521 |
| 5,136,590 | 8/1992 | Polstra et al. | 371/16.2 |
| 5,231,693 | 7/1993 | Backes et al. | 395/99 |

FOREIGN PATENT DOCUMENTS

| | | |
|---|---|---|
| 2558910 | 7/1977 | Germany . |
| 1413938 | 11/1975 | United Kingdom . |

OTHER PUBLICATIONS

Proceedings of computer Software & Applications Conference, Oct. 1987; Tokyo, Japan; Yoshizawa et al. "Test and Debugging Environment for Large Scale Operating Systems", pp. 298–205.

*Primary Examiner*—Hoa T. Nguyen
*Attorney, Agent, or Firm*—Browdy and Neimark

[57] ABSTRACT

The method for testing and, if necessary, validating the primitives of a real-time executive embodying the invention consists in having a succession of operation phases executed by a set of concurrent tasks of the real-time executive, under the direction of a driver task which organizes the working of the concurrent tasks, and which regulates launching and detects completion thereof. Each operation phase comprises the random selection of a launching mode, launching of the concurrent tasks, freeing from their standby status, detection of the arrival of each of the concurrent tasks at the end of its route and memorization of characteristic primitives of the operation phase that has just taken place. The invention enables validation of the real-time executives used notably in the fields of aeronautics, space, nuclear sector, railways, medicine and even robotics.

13 Claims, 4 Drawing Sheets

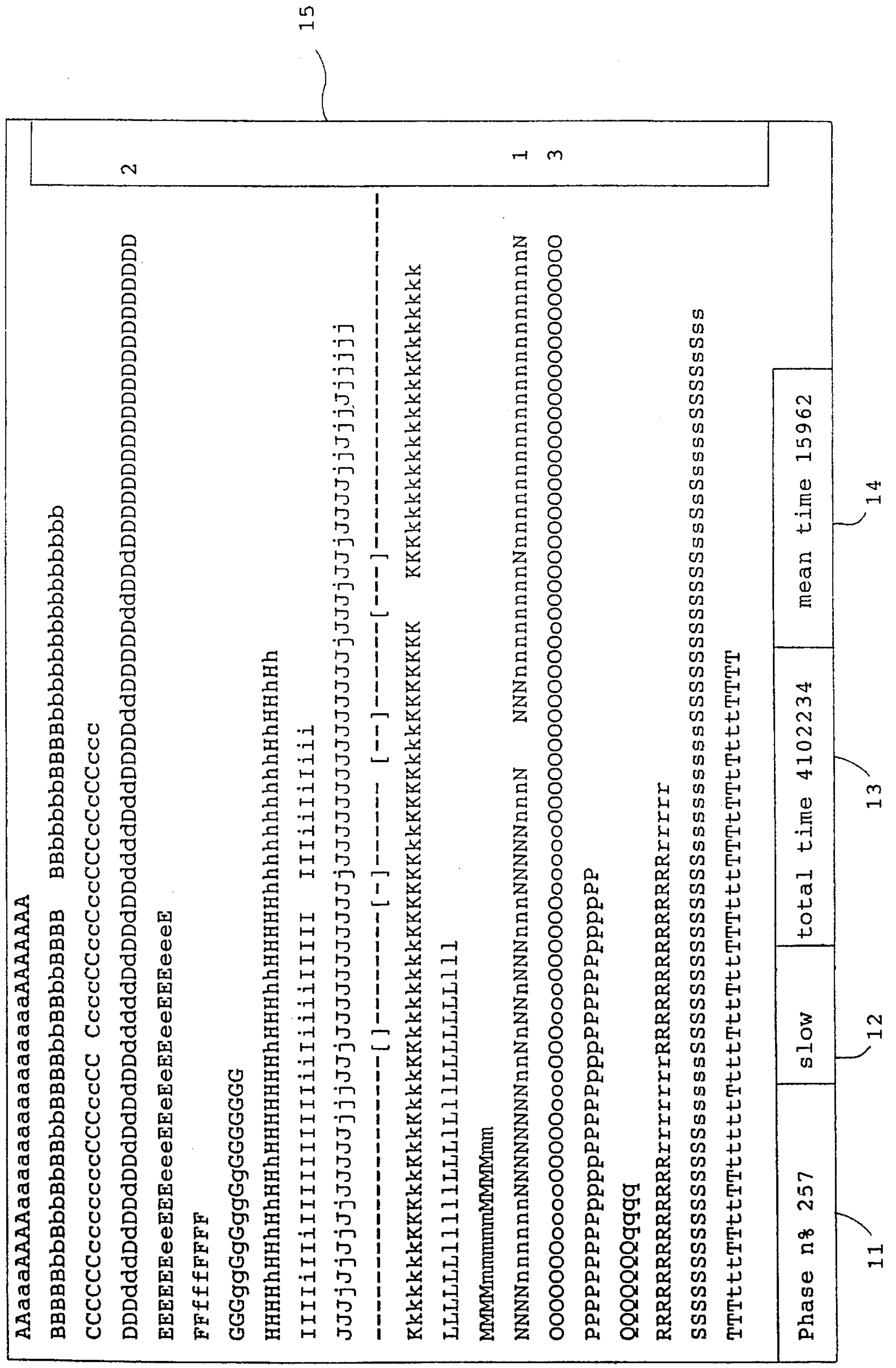

FIG. 3

```
AAaaaAAAAaaaaaaaaaaaaAAAAAA
BBBBBbbBBBbbbBBBBbbbBBBBB    BBbbbbbBBBBbbbbbbbbbbbbbbb
CCCCCCcccccccCCCCcccCC   CccccCCcccCcccCCCCCCcccc
DDDddddDDDDDdddddddDDDdddddDDDDdddddDDDDddddDDDDDDDDDDDDDDDDD
EEEEEEeeeEEEeEeeEeEEEEeeeE
FFfffFFFF
GGGggGgGggGgGGGGGGG
HHHHHHhhHHHHHHHHHhhhhhHHHHHHHHhhhhhhhhhHHHHh
IIIIiIIIIIIIIiiiiiiiIIIII   IIiIiIiIii
JJJjJjJjJjJJJJjjjJjJJJJJJJJJJJJJJjJjJJJjJjJJjJjJJjjjjj
------[-]------[-]------[---]-----[---]-----------
KkkkkkkKKkkkkkkkkKKKKKKKKKKKKKKKKKK     KKKKKKKKKKKKKKKKKK
LLLLlllllllllLLLLLLll
MMMMmmmmmMMMmm
NNNNnnnnnnNNNNNNNNNnnnN    NNNnnnnnnnnNnnnnnnnnnnnN
OOOOOooooooOOOOooooOOOOOOOOOOOOOOOOOOOOOOOO
PPPPPPPPPPPPPPPPPPPPpppppPP
QQQQQQqqqq
RRRRRRRRRrrrrrrrrrRRRRRRRRRRrrrr
SSSSSSSSSSSSssssssssSSSSSSSSSSSSSSSSSSSsSSsssssSSSSSSSss
TTTtttTTTttttttTttTtttttTtTTTTTTT
```

| Phase n° 257 | slow | total time 4102234 | mean time 15962 |

2
1
3
15
11
12
13
14

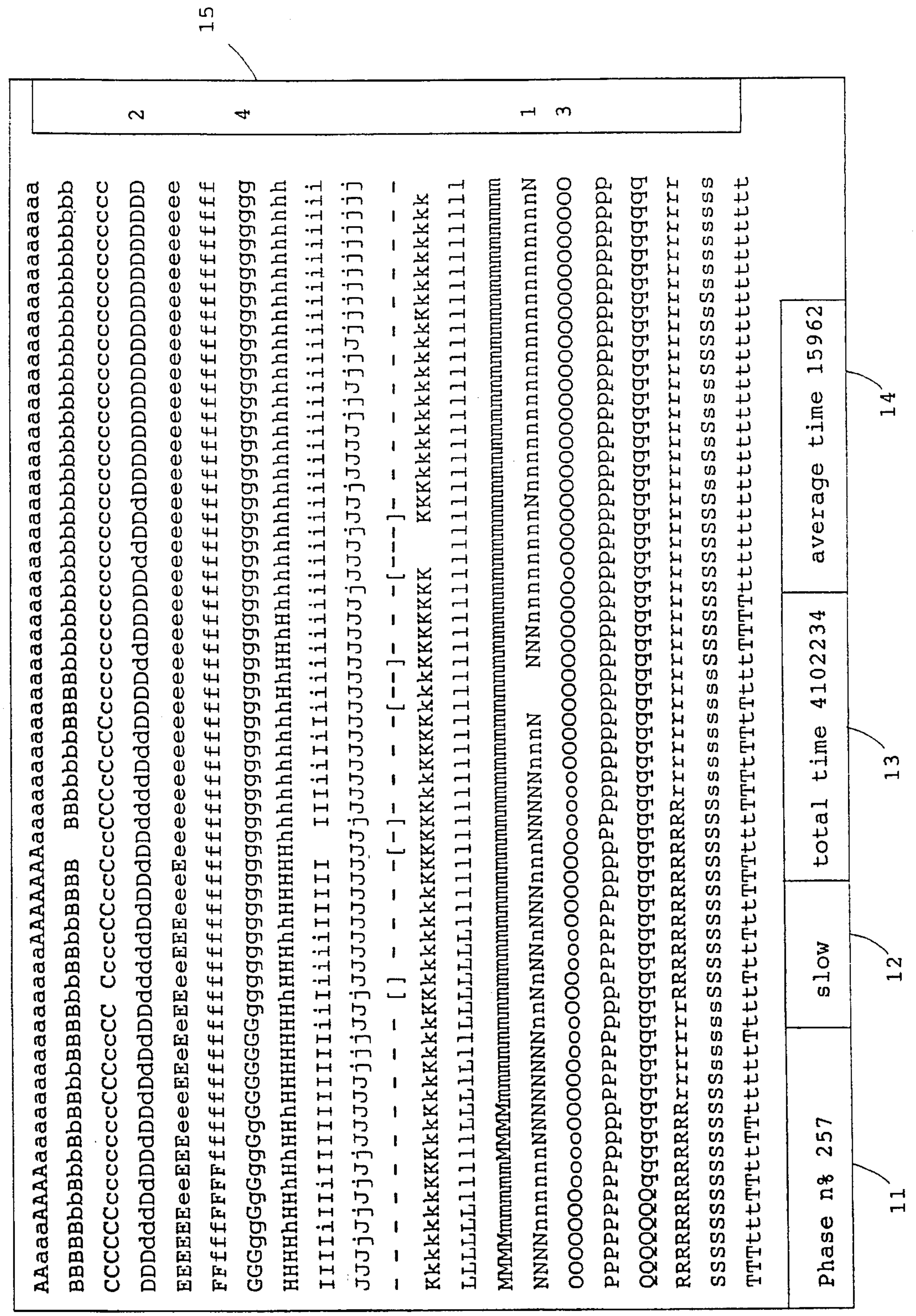

FIG. 4

```
AAaaaAAAAaaaaaaaaAAAAAaaaaaaAAAAAAaaaaaaaaaaaaaaAAAAAaaaaaaaaaaa
BBbbBBBbbBBBBBBbbBBBBBBbBBBB    BBbbbbBBBBbbbbCCCCccccccccccccccc
CCCCCCccccccCCCCC   CcccCCCCccCCC  CccccCCcccCCCCCCccccccCCCcccccc
DDDddddDDDDddDdddDdDDDdddddDDDdDddDdddDDDDdDdDDdDDDDDdDdDDDDDDDDD
EEEEEEeeEEEEeeEEeeeEEEeeEeeeeeeeeeeeeeeeeeeeeeeeeeeeeeeeeeeeeeee
FFffffFFFffffffffffffffffffffffffffffffffffffffffffffffffffffff
GGgggGgGgGGGGGggggggggggggggggggggggggggggggggggggggggggggggggg
HHHHhhHhHHHHHHHHHHHhHHhhhhhhhhhhhhhhhhhhhhhhhhhhhhhhhhhhhhhhhhhh
IIIIiIiIIIIIIIIIIiiiiiiIIIii       IIiIiIIiIIiiiiiiiiiiiiiiiiii
JJjJjJjJjjJJJJJjjjjjJjJJJJJJJjjjjJJJJjJjJJjJjJjJjJjJjJjJjJjJjJjj
- - - - - - - [ ]  - - - -[-]  - - [---]- - - -[---]- -          -
Kkkkkkkkkkkkkkkkkkkkkkkkkkkkkk     KKkkkkkkkkkkkkkkkkkkkkkkkkkkk
LLLLLLlLlLLLLLLlLLLLlllllllllllllllllllllllllllllllllllllllllll
MMmMMmMmmMMMMmmmmmmmmmmmmmmmmmmmmmmmmmmmmmmmmmmmmmmmmmmmmmmmmmmm
NNNNnnnnnnnnNNNNNNNnnNnNnNNNnnnNNNNNnnnN    NNNnnnnnnnNnnnnnnnnN
OOOOooooooOoOOoooOOoOooooooooooOOOOOOOOOOOOOOOOOOOOOOOOOOOOOOOOO
PPPPPPPPPPpPPPPPPPPPPPPPPPPpppppppppppppppppPPPPPPPPPPPPPPPPPPPP
QQQQQQqqqqQqqqqqqqqqqqqqqqqqqqqqqqqqqqqqqqqqqqqqqqqqqqqqqqqqqqqq
RRRRRRRRRRRRRRrrrrrrrrrrRRRRRRrrrrrrrrrrrrrrrrrrrrrrrrrrrrrrrrrr
SSSSSSSSSSSssssssSSsssssssSSSSSSSSSSSSSSSSSSSSSSSSssSssssssssss
TTTtttttTTTttttttttTTTTTTTTTTttttttttttttttttttttttttttttttttt
```

| Phase n⁰ 257 | slow | total time 4102234 | average time 15962 |
|---|---|---|---|
| 11 | 12 | 13 | 14 |

METHOD FOR TESTING AND VALIDATING THE PRIMITIVES OF A REAL-TIME EXECUTIVE BY ACTIVATING COOPERATING TASK USING THESE PRIMITIVES

BACKGROUND OF THE INVENTION

1. Field of the Invention

This invention relates to a method for testing and, if necessary, validating primitives of a real-time executive, i.e. a software, hardware and/or microprogrammed device, capable of executing several tasks on a processor designed to execute just one task at a time.

2. Description of the Prior Art

It is of interest, on the one hand, to firms who design and develop real-time executives such as the constructors of computers and microprocessors, constructors of real-time language compilers, manufacturers of computer systems or industries developing real-time applications with their own executives and, on the other hand, to industries developing real-time applications notably in the following fields: aeronautics, space, nuclear sector, railways, medicine, robotics, etc.

In the first case, these firms need to validate the product before marketing it. In the second case, these firms need to assess and verify the operating of the executives proposed on the market in order to choose the must trustworthy and the best suited to their needs.

It is recalled that each task of a real-time executive can be assimilated to a thread of control which performs on the processor while using all the resources of the machine required for execution: registers, memories, peripherals, execution time, . . .

The tasks are, theoretically, independent. They can become synchronized, communicate or exclude each other depending on the mechanisms proposed by the executive. When the tasks are implanted in a single physical processor, they are in fact run in pseudo-parallel as the processor can only execute one instruction at the time.

There is synchronization between two tasks A and B, when task A is waiting (to continue execution) for task B to free it, whence a notion of order of execution of the tasks with regard to one another. The typical diagram is that of producer/consumer where the consuming task is waiting (to consume) for the producing task to have produced.

There is communication between two tasks A and B when task A uses data created by task B. The typical diagram is also that of producer/consumer where the consuming task is waiting (to consume) for the producing task to have produced.

There is exclusion between two tasks A and B when task A is not authorized to use a resource at the same time as task B. Task A must therefore wait until task B is no longer using the resource in order to be able to use it.

A task can be put in different statuses, such as, e.g.:

—"Dead task" status (known to the application but without any connection with the launching context): in the event of a serious anomaly, one or more tasks may find themselves unable to perform any more. They are then put into the "dead" state and are no longer managed.

—"Dormant task" status. In this state, which is that of a task having completed performance or that has just been initialized, the task has all the parameters required to start its application.

—"Eligible task" status in which the task is awaiting a processor resource and can run as soon as the scheduler decides to allocate the processor to it.

—"Elected task" status which is that of a task having gained possession of the processor by moving from the "eligible" state to the "elected" state.

—"Suspended task" status is that of an elected task having encountered an unfulfilled condition, this task moving into the eligible state when this condition is fulfilled.

In respect of the last status, the task can be on standby for an event if it farmed out an operation to an other task of the system and is awaiting completion of the latter. It can be awaiting a resource, in the general sense, if, in order to continue, it requires a piece of hardware or software that is unavailable.

It is therefore clear that the different tasks of an executive are not usually completely independent and sometimes need to become synchronized, to communicate data with one another and to gain access to resources that cannot be shared.

For instance, a task may be preempted to the benefit of another task depending on the criteria selected by the scheduler. If, in the course of execution, the task encounters an unconditional suspension primitive or an unfulfilled condition upon, in particular, a delay, a write operation in a full mailbox, a read operation in an empty mailbox, or upon occurrence of an event, it abandons the processor to another task.

In order to take these particularities into account and to enable such an operating sequence, the executive offers (the programmer) a set of synchronization, communication and resource-sharing primitives. Utilization of these primitives solely in the necessary parts of the multi-task application enables the different tasks to perform asynchronously with regard to one another.

It is within this asynchronism that the problem of validating real-time applications is to be found, and consequently that of validating the executives themselves.

Contrary to a synchronous operation, a program operating asynchronously by means of the tasks composing it, requires an uncountable number of states (at least from the human point of view), as a result of which proof of the coherence of these states cannot be established.

This is notably due to the fact that during production of a program, at each point of the program, the programmer masters the state in which he is and determines the following state as a function of the instruction that will be implemented. This reasoning is applied from the first to the last instruction of the program by determining the program input data and therefore enables the expected results to be forecast.

The state of the program is more or less represented by the value of each of its variables at a given moment and in a given place (respectively indicated by the internal clock and by the instruction counter).

When the program has several tasks, the reasoning can be applied to each of the tasks provided the task changes are mastered in space and in time by the programmer. If this condition is no longer fulfilled, the programmer can no longer determine the exact chaining of the states of his program.

The program is then referred to as non-deterministic (i.e. requiring an infinite number of states).

In fact, task changes are usually mastered when they take place at privileged points of the program, typically when a primitive of the executive is called. The executive is then deemed "non-preemptive".

It so happens that most real-time executives are preemptive and do not enable theses changes to be mastered, and that the approach used by the programmer to validate deterministic software is only partially applicable to the validating of non-deterministic software.

OBJECT OF THE INVENTION

The main object of this invention is to perfect a solution enabling these problems to be solved.

SUMMARY OF THE INVENTION

Accordingly, the invention is based on the observation that not all real-time executives have the same set of primitives, that they propose different mechanisms for synchronization, communications, etc., but that all enable concurrent execution of cooperating tasks.

It accordingly provides, in a general manner, a method for testing the primitives of a real-time executive enabling several tasks to be executed in parallel on a processor designed to execute just one task at a time, each task using all the resources of the machine required for its execution, and this by means of a set of synchronization and resource-sharing primitives which enable the different tasks to be executed asynchronously.

According to the invention, this method is characterized in that it consists in running plural cooperating tasks, i.e.:

—a set of concurrent tasks, based on a same model and only differing from one another by way of their static context (designation, priority), each of these concurrent tasks being capable of performing a randomly determined sequence of actions of two types (i.e. actions generating a progression in the operating of the task and actions consisting in standbys);

—a driver task which organizes the running of the concurrent tasks and which more particularly regulates the launching of the concurrent tasks, activates the operating sequence and detects completion thereof; and —an internal resource server task, such as a random number distributor.

Said running comprising:

—determination of the respective priorities of the tasks, so as to spread their activity over time and create a maximum number of different preemption cases, —a prior phase comprising:

. an initializing of the real-time clock,

. launching of the driver task,

. creation of the necessary set of real-time objects,

. launching of the server tasks,

—a succession of operation phases during each of which the driver task runs the concurrent tasks through a same operating sequence, this phase comprising:

. random selection of a launching mode of the concurrent tasks, from among different predetermined launching modes, . launching of the concurrent tasks according to the selected launching mode, by means of randomly selected primitives, in a randomly determined order, each of the tasks randomly selecting the aforesaid actions once they have been launched, . freeing of the concurrent tasks from their standby status, either by expiry of the delays blocking them, or by random selection of public or private event numbers which free the concurrent tasks awaiting these events.

. detection of the arrival of each of the concurrent tasks at the end of the operating sequence, . taking into account and memorization of characteristic parameters of the operation phase that has just taken place, . modification of the order in which the operation tasks will be relaunched during the following operation phase, . launching of the following operation phase, . analysis of the above-mentioned parameters during and/or upon completion of the aforesaid operation phases.

According to this method, the operation phases never repeat and must be successfully completed. Perpetual execution of these operation phases serves as validation. Failure of the races to concatenate means there is an anomaly.

One of the particularities of the previously described method consists in that, in a preemptive real-time context, it enables a maximum number of primitives to be tested in one go, while providing a result that is very easy to verify.

This is a particularly important advantage for the following reasons:

A first reason is due to the fact that if the primitives of an executive are tested one by one or in indissociable groups, the test is less relevant as it does not create any delicate situation within the executive. It merely checks that the arguments pass properly and that the primitives proceed correctly during a quasi-sequential operating sequence. In view of this, it is like a unit test of the same type as the one already conducted by the supplier of the executive.

A second reason consists in the fact that the final application, unlike the test application, uses a bigger sub-set of primitives than in a unit test without it being always possible to determine in advance what its choices will be.

Because it enables all the primitives of the executive to be tested in a same application, the method embodying the invention covers the conditions of use of the executive by the final application. If these tests prove positive, a guarantee of proper functioning is then obtained. This result extends far beyond that obtained by an integration test which only tests the executive in the conditions of use specific to a single application.

BRIEF DESCRIPTION OF THE DRAWINGS

Further features and advantages of the invention will be apparent from the following particular description of an embodiment of the test method, and of programming elements used for the validation of the mailboxes and real-time executive of a 7000-SERIES computer developed by the filing party, as illustrated in the corresponding accompanying drawings in which:

—FIGS. 1 to 4 are graphic representations showing the progressions of the concurrent tasks throughout a same operation phase, i.e. just before the operation phase (FIG. 1), at the start of the operation phase (FIG. 2), in the middle of the operation phase (FIG. 3) and at the end of the operation phase (FIG. 4).

Figure 1:
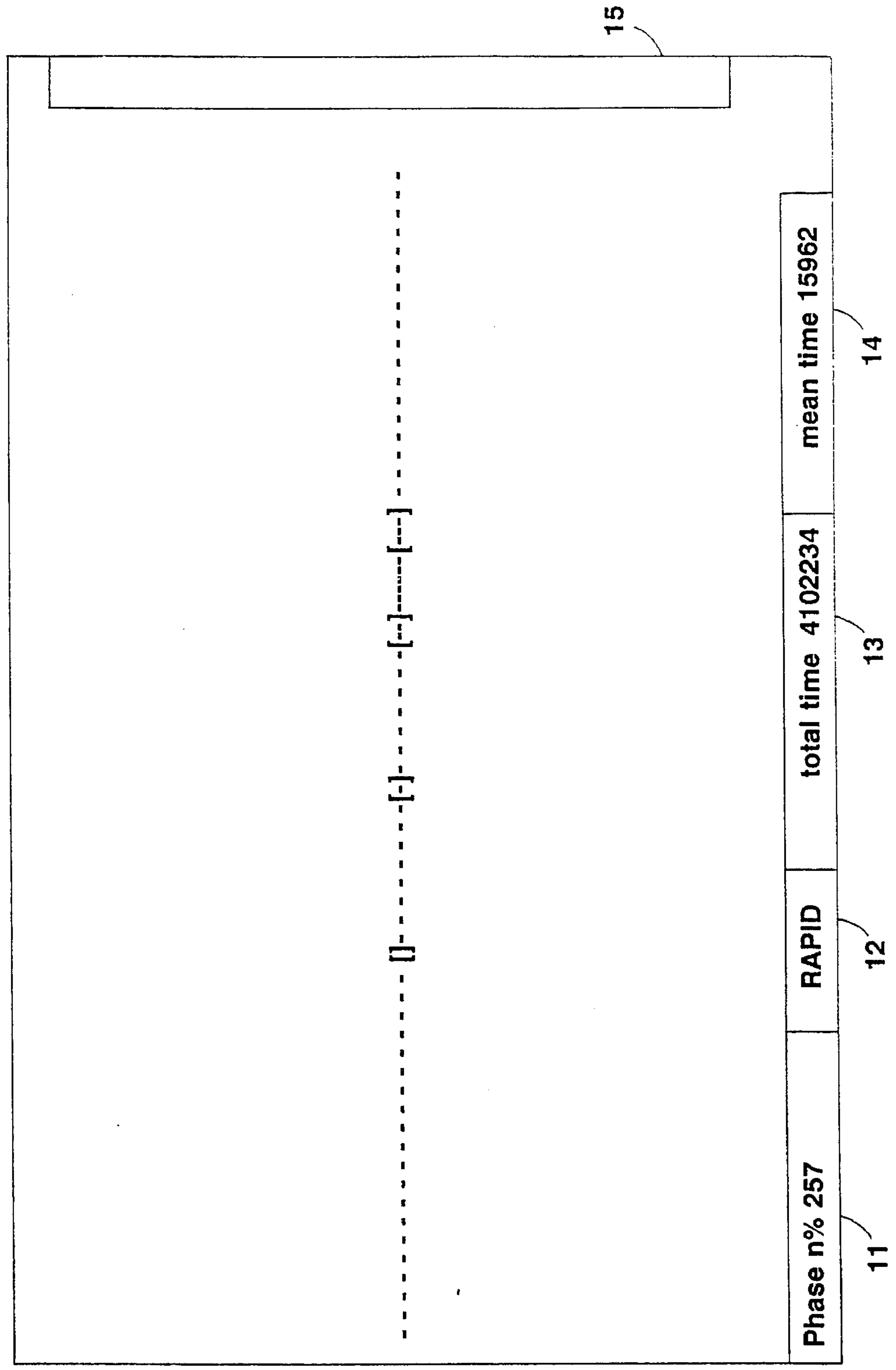

It should firstly be recalled that an executive is deemed a real-time executive when it can guarantee a response time upon occurrence of a periodic (synchronous) or aperiodic (asynchronous) external event, through knowledge of the time lapsing and measured by a clock, and through priorities attributed to the different tasks, and to the preemptive nature or otherwise of the executive.

When two tasks have different priorities, a non-preemptive executive favors execution of the task with the highest priority. A preemptive executive ensures at all times that the task with the highest priority among the executable tasks is effectively performing. When a task with a higher priority is freed from its standby status, it preempts the task in process to perform instead of it.

The method embodying the invention proposes to test the primitives of a real-time executive by concurrently running a set of cooperating tasks called concurrent tasks based on a same model, during plural operation phases that can each be assimilated to a race. These operation phases differ from one another by way of the random selection of the launching mode and of the actions generating a progression or a standby in the operating sequence of the tasks.

In fact, this process is intended to create a multiplicity of multi-task applications in which occasions can be found to use the different services of an executive.

The operation phases are managed by a driver task (race driver), which starts and launches the concurrent tasks by randomly selecting for each of these tasks a given launching mode from among a set of launching modes provided in advance, such us:

—immediate unconditional launching,

—launching deferred on standby for an event,

—launching deferred on standby for a delay which is itself random,

—etc.

Not only are the concurrent tasks launched by a randomly selected primitive, but the order in which these tasks are launched is also randomly determined.

Once the concurrent tasks have been launched, the driver task monitors the registers of arrival (completion) of the concurrent tasks.

Once launched, each concurrent task will have actions of two different types randomly attributed to it, i.e. actions of a first type which consist in a progression, and actions of a second type which consist in a standby.

In this way, a concurrent task may take several successive steps before stopping, randomly.

As long as all the concurrent tasks have not reached completion (end of the operation phase), the driver task frees the concurrent tasks from their standby status, as follows:

—it randomly selects public or private event numbers and causes occurrence of these events, thereby freeing the concurrent tasks awaiting them, —the delays blocking the concurrent tasks expire on their own, —because it has the lowest priority (background task), it only takes over when all the other tasks are blocked.

When all the concurrent tasks have been completed (arrived at destination), the driver task randomly modifies the order in which these tasks will be relaunched for the following operation phase.

It is clear that the previously defined method enables the performances of an executive to be assessed on a given processor.

Measurement of the time lapsed over the operation phases and of the average duration of an operation phase (recalculated after each of said phases) are interesting parameters to study: they enable comparisons to be made, at macroscopic level, anomalies to be detected and even adjustments to be made. This method cannot measure the duration of a given primitive, but it does enable overall performance to be appraised.

A further advantage of the method embodying the invention consists in that it enables manufacturers of executives to compare different solutions.

In addition to the concurrent tasks and driver task, the method embodying the invention may use at least one external resource (peripheral) server task such as a screen management task, an internal resource (computation) server task such as the distributor of random numbers used in the method, and a cyclical task.

In fact, the progression of the concurrent tasks can be advantageously displayed on a viewing screen of the conventional type, e.g. 24-line/80-column XY-addressable type. As this screen is a non sharable resource, it is therefore managed by the server type task which groups together and processes in the order of arrival all the display requests arriving at it from the other tasks.

In this way, for instance, the requests arrive in the form of messages deposited in a mailbox. The tasks prepare their message and send it ("SEND" primitive) into the box. If the box is full, the tasks are blocked while awaiting to be able to deposit their message and continue. As for the external resource server task ("DISPLAY_TASK"), loops upon receipt of the message ("RECEIVE" primitive) and the processing of the message received. If the box is empty, the server task is blocked while awaiting to receive a new message. These messages describe the type of input/output required for the caller task. Typically, the messages contain the following information:

—the line number and column number on the screen,

—the type (integer, character, chain of characters, . . . ),

—the value of the integer, character or chain of characters.

The string of characters transmitted to the peripheral is made indivisible by this external resource server task which completely processes a request before taking the following request into account, irrespective of the priority of the caller tasks.

The random number distributing task ("RANDOM_TASK") looks after distribution of the random numbers used by the tasks. Instead of providing tasks with their own random number generator, it proved preferable to have a server type task which calculates and provides all the random numbers requested by all the tasks.

In this way, for instance, the random numbers are deposited in a mailbox ("RANDOM_BOX"). Tasks wishing to obtain a number switch to receipt from the mailbox ("RECEIVE" primitive). If the box is empty, the caller tasks are blocked while awaiting to be able to extract a number and continue execution. As for the internal resource server task ("RANDOM_TASK"), in this instance a random number distributing task, it loops on the calculation of a random number and the sending of the number ("SEND" primitive) into the box. If the box is full, the server task is blocked while awaiting to be able to deposit a new number.

The cyclical task, which is completely independent from the other tasks, periodically imposes two speeds which influence the operating of the concurrent tasks during the different operation phases.

This cyclical task uses e.g. a "SPEED_EV" event which it triggers at each new cycle. To do so, it uses three primitives:

—a first primitive called "TEST_EVENT" to know what state it is in,

—a second primitive called "SET_EVENT" to set it to the occurred state (slow speed), —a third primitive called "RESET_EVENT" to set it to the non-occurred state (fast speed).

Since this task is cyclical and cannot authorize itself any delay whatsoever, it displays its status (fast/slow speed) by means of a message sent conditionally ("TEST_AND_SEND" primitive) to the screen server.

All the previously mentioned tasks play an important role insofar as they have a substantial job to accomplish which represents a processor occupancy rate that is far from negligible.

Furthermore, the respective priorities of these tasks are settled so as to spread their activity over time and to create a maximum number of different cases of preemption. As previously mentioned, the driver task has the lowest priority since it is the background task. The external resource server task ("DISPLAY_TASK") has a higher priority, followed by the concurrent tasks which are preferably spread over several levels of increasing priority. The internal resource server task ("RANDOM_TASK") has a corresponding level of priority which is substantially at an average level of the priorities of the concurrent tasks. The cyclical task ("SPEED_TASK") is attributed the highest priority in order to ensure its cyclical nature.

In this example there are twenty concurrent tasks grouped together in two groups of ten, in each of which the concurrent tasks have priorities in decreasing order, the average values of the priorities (strength) of these two groups being substantially equal.

Each task is represented on the screen by a single letter (or series of identical letters presented in the form of a histogram) which is displaced over a route comprising 77 elementary steps (track) as the task advances. The first group comprises the tasks A to J, whereas the second group comprises tasks K to T.

In this case, the prior phase of the method embodying the invention comprises, in order:

—initialization of the real-time clock of the executive,

—launching of the driver task,

—creation of all the necessary real-time objects such as the mailboxes,

—launching of the two server tasks (screen manager and random number distributor).

At the start of the operation phase, the driver task clears the screen, displays the route that must be followed by each of the tasks (FIG. 1) as well as data of a general order such as:

—the number of the next operation phase (or race),

—the total time of the operation phases already carried out,

—the average time of an operation phase,

—etc.

The routes of each of the concurrent tasks can comprises common "obstacles" managed as a non-sharable resource, and each of these "obstacles" can only be overcome by one concurrent task at a time. When the task is front of an obstacle, it must wait for the obstacle to be freed before it can overcome it. To do so, upon arrival at an obstacle, each task requests access to the corresponding resource by means of a "RESERVE" primitive or by means of a "TEST_AND_RESERVE" primitive, depending on the case, and at the end of the obstacle frees the resource it was occupying, by means of a "FREE" primitive. A concurrent task may, for instance, overcome a busy obstacle without waiting for it to be freed, if it obtains a bonus by random selection and if the cyclical task displays a given status (e.g. fast speed).

Each concurrent task advances until it reaches the end of the route (arrival line). In the latter case, the concurrent tasks inscribe their name in a register which is permanently consulted by the driver task in order to detect the end of an operation phase so as to relaunch a new one. In this way, for instance, the concurrent tasks that have crossed the arrival line deposit ("SEND" primitive) their identification code into a mailbox ("AT_END_BOX"), thereby attesting that they have indeed completed their route and have not remained blocked along the route. As far the driver task, it extracts the identification codes of the concurrent tasks that can have been inscribed since its last consultation ("TEST_AND_RECEIVE" primitive).

The tasks are ranked according to their order of arrival at the end of the route. As previously, the driver task sends to the appropriate mailbox ("RANK_BOX" task) the number of rankings theoretically retained before restarting the concurrent tasks, no distinction being made between the last tasks to have arrived. In this example, only the first four concurrent tasks are ranked, it being understood that this type of ranking is perfectly arbitrary. As previously mentioned, the driver task manages the register of arrival of the concurrent tasks and, as long as it has not reached the amount signifying that the operation phase is completed, it will itself free the concurrent tasks from the standby status as follows: it randomly selects public or private numbers and causes occurrence of these events, thereby freeing the concurrent tasks that may have been awaiting them. The delays blocking the concurrent tasks expire on their own. In this way, for instance, the concurrent tasks block due to "WAIT_DELAY" and "WAIT_EVENT" primitives. The standby for an event can either be in respect of a private event attached to each concurrent task ("CONCUR_EV") or in respect of a public event common to all the concurrent tasks "DRIVER_EV". The driver task frees these tasks by means of the "PULSE_EVENT" primitive upon occurrence of these events.

As background task, the driver task only takes over when all the other tasks are blocked (in other words, when there is nothing better to do, the decision is taken to advance the operation phase).

If the executive proposes a primitive stopping the periodicity of the cyclical tasks, this primitive can be tested on the speed task as soon as a concurrent task arrives. A visual check is made to ensure that the rest of the race is taking place under the same speed conditions.

In the example previously described, the method embodying the invention applied to a one-processor configuration. It is worth noting in this respect that the method also applies to the testing of multiprocessor executives since all inter-task relations take place via the executive and no task can directly see an object handled by another task. It is therefore perfectly possible to divide the tasks into separate memories provided the executive proposes data communication primitives. The dividing of the tasks over the different processors is simply a question of imagination.

For instance, in a two-processor configuration, the first processor can be allocated to a driver task, the cyclical task and the concurrent tasks. The second processor can be allocated to the two server tasks (external and internal).

In a four-processor configuration the first processor can be attributed e.g. to the driver task and to the cyclical task, the second processor to the concurrent tasks, the third processor to the internal server task and the fourth processor to the external server task.

Though non-determinism is the primordial feature of the method embodying the invention, it is nonetheless possible to render it deterministic e.g. for the purposes of repetitiveness.

A first solution consists in suppressing everything relating to time, such as the standbys on delays and the cyclical tasks.

Another more interesting solution, when the lapsing of time can be mastered at executive level, consists in simulating clock beeps and to arrange that, when the driver task takes over, (all the concurrent tasks being blocked on some standby state or other), it can cause the equivalent of a clock beep and arrange for time to lapse, though synchronously with the tasks.

Of course, all deterministic versions offer a much narrower range of tests than non-deterministic versions.

The sample embodiment of the method embodying the invention, described hereinafter, is intended to ensure validation of the mailboxes and of the real-time executive (preemptive type) of computers marketed under the 7000-SERIES name by the filing party and for which the following primitives require testing:

TASK (task) immediately launches the specified task.

TASK_EVENT (task, event) launches the specified task while awaiting the specified event. If the event has already occurred, this primitive is equivalent to TASK.

TASK_DELAY (task, delay) launches the specified task while awaiting the specified delay. If the delay has already expired, this primitive is equivalent to TASK.

CYCLE (task, period) immediately launches the specified task. The task will be automatically relaunched at the specified period.

END_CYCLE (task) stops the periodicity of the specified task without stopping the task.

END_TASK stops execution of the task in process. The task must be relaunched by a launching primitive.

SET_EVENT (event) sets the specified event to the occurred state. All tasks awaiting this event are freed.

RESET_EVENT (event) sets the specified event to the non-occurred state.

TEST_EVENT (event, report) provides the status of the specified event in a report.

PULSE_EVENT (event) sets the specified event to the occurred state then to the non-occurred state in an indivisible manner. All tasks awaiting this event are freed.

WAIT_EVENT (event) blocks the task awaiting the specified event if it has not already occurred, otherwise it does nothing.

RESERVE (resource) requests access to the specified resource. If the resource is free, the task continues execution while occupying the resource. If the resource is busy, the task is blocked on standby for the freeing of the resource.

TEST_AND_RESERVE (resource, report) tests and requests access to a specified resource. The report indicates the status of the resource. If the resource is free, the task continues execution while occupying the resource. If the resource is busy, the task continues execution without occupying the resource.

FREE (resource) frees access to the specified resource. If several tasks are on standby for this resource, it is attributed to the task with the highest priority which resumes execution.

WAIT_DELAY (delay) blocks the task awaiting the specified delay if not already expired, otherwise it does nothing.

TIMER decrements the delay and period counters managed by the executive. This primitive is normally placed in the Real-Time Clock interruption procedure. It advises the executive of the lapsing of time.

SCHEDULE enables the tasks to be scheduled when the TIMER primitive is used outside an interruption procedure.

SEND (mailbox, message) sends the specified message into the specified mailbox. If the box is not full, the message is deposited and the task continues execution. If the box is full, the task is blocked, on standby to deposit its message.

TEST_AND_SEND (mailbox, message, report) attempts to send the specified message into the specified mailbox. The report indicates the status of the box (full or not). If the box is not full, the message is deposited and the task continues execution. If the box is full, the task continues execution without having deposited its message.

RECEIVE (mailbox, message) receives the specified message in the specified mailbox. If the box is not empty, the oldest message is extracted and the task continues execution. If the box is empty, the task is blocked, awaiting to be able to receive a message.

TEST_AND_RECEIVE (mailbox, message, report) attempts to receive the specified message in the specified mailbox. The report indicates the status of the box (empty or not). If the box is not empty, the oldest message is extracted and the task continues execution. If the box is empty, the task continues execution without having received the message.

In this executive:

—The priority of the tasks is included between 0 (highest) and 63 (lowest) and all the tasks have differentiated priority. The tasks are identified by a number corresponding to their priority.

—The events, resources and mailboxes are also identified by a number.

—The events are initially in the non-occurred state, the resources in the free state and the mailboxes in the empty state.

The concurrent tasks, 10 in number, are divided into two groups in which they are respectively designated by the terms CONCUR (A to J) and CONCUR (K to T).

The method embodying the invention, which is executed by a program, begins by a call to the power-up interruption procedure. As soon as the Real-Time Clock is initialized, the Real-Time Clock interruption procedure is automatically called by the equipment at the rhythm selected.

The program has the following global objects:

—DISPLAY_BOX mailbox
—RANDOM_BOX mailbox
—RANK_BOX mailbox
—AT_END_BOX mailbox
—SPEED-EV common event
—DRIVER-EV common event
—CONCUR_A_EV private event
—CONCUR_B_EV private event
—CONCUR_C_EV private event
— . . .
—CONCUR_T_EV private event
—GATE1_RES resource
—GATE2_RES resource
—GATE3_RES resource
—GATE4_RES resource Power-up interruption procedure
  Initializing of the Real-Time Clock at a rhythm of 1 ms (non-deterministic version only)
  Initializing of absolute time at O
  call TASK primitive (DRIVER_TASK) to launch the driver task
End of interruption
Real-Time Clock interruption procedure (non-deterministic version)
  Increment Absolute Time
  call TIMER primitive
End of interruption
DRIVER_TASK task priority 23
  Initialize the number of races at 0
  Creation of the Real-Time objects: mailboxes
  call TASK primitive (RANDOM_TASK) to launch the random number server
  call TASK primitive (DISPLAY_TASK) to launch the screen server
  Repeat
  call NEW_RACE
  Indefinitely
End DRIVER_TASK
NEW_RACE procedure
  Clear screen
  call DISPLAY_TRACK call DISPLAY_RACE call SEND primitive (RANK_BOX) four times to rank the first four concurrent tasks For all the tasks taken in a theoretical order call START_CONCUR (parameters of the concurrent task)

End For call CYCLE primitive (SPEED_TASK) to cyclically launch the cyclical task with a period included randomly between 100 ms and 1 s Repeat call TICK (deterministic version only)

Select a number between 1 and 21

Case 1: call PULSE_EVENT primitive (CONCUR_A_EV) private event

Case 2: call PULSE_EVENT primitive (CONCUR_B_EV) private event

Case 3: call PULSE_EVENT primitive (CONCUR_C_EV) private event

. . .

Case 19: call PULSE_EVENT primitive (CONCUR_S_EV) private event

Case 20: call PULSE_EVENT primitive (CONCUR_T_EV) private event

Case 21: call PULSE_EVENT primitive (DRIVER_EV) common event

End of Cases call TEST_AT_END

If a first concurrent task has arrived call END_CYCLE primitive (SPEED_TASK) to stop the cyclical nature of the cyclical task End If Until all the concurrent tasks have arrived Mix the starting order of the concurrent tasks for the next race End NEW_RACE START_CONCUR procedure (CONCUR_TASK)

Select a number between 1 and 3

Case 1: call TASK primitive (CONCUR_TASK) to immediately launch the concurrent task Case 2: call TASK_EVENT primitive (CONCUR_TASK) for deferred launching of the concurrent task awaiting its private event Case 3: call TASK_EVENT primitive (CONCUR_TASK) for deferred launching of the concurrent task awaiting a delay included randomly between 0 and 100 ms End of Cases End START_CONCUR TEST_AT_END procedure Repeat call TEST_AND_RECEIVE primitive (AT_END_BOX) to attempt to receive a message If message received, then inscribe the arrived concurrent task in the register Until expiry of the messages on standby End TEST_AT_END DISPLAY_TRACK procedure Prepare a message to display the track:

For all characters constituting the track call SEND primitive (DISPLAY_BOX) to send this character End For End DISPLAY_TRACK DISPLAY_RACE procedure Increment the number of races between the concurrent tasks Prepare a message to display the race number:

—the text "Phase No" on line 24, column 1 call SEND primitive (DISPLAY_BOX) to send this text

—the race number on line 24, column 10 call SEND primitive (DISPLAY_BOX) to send this number

Prepare a message to display the total time of the races:

—the text "Total time" on line 24, column 30 call SEND primitive (DISPLAY_BOX) to send this text

—the total time in ms on line 24, column 42 call SEND primitive (DISPLAY_BOX) to send this number

Prepare a message to display the average time of a race:

—the text "Average time" on line 24, column 50 call SEND primitive (DISPLAY_BOX) to send this text

—the average time in ms on line 24, column 62 call SEND primitive (DISPLAY_BOX) to send this number

End DISPLAY_RACE

TICK procedure (only called in the deterministic version)

Increment Absolute Time call TIMER primitive call SCHEDULE primitive

End TICK

RANDOM function call RECEIVE primitive (RANDOM_BOX) to receive a message

Return the floating random number belonging to the interval (0.0 included and 1.0 not included) contained in the message End RANDOM CONCURRENT_A_TASK task priority 1

Concurrent task A will run on line No. 1 from column 1 call MOVE_CONCUR (parameters of concurrent task A)

End CONCUR_A_TASK

CONCURRENT_B_TASK task priority 3

Concurrent task B will run on line No. 2 from column 1 call MOVE_CONCUR (parameters of concurrent task B)

End CONCURRENT_B_TASK

CONCURRENT_C_TASK task priority 5

Concurrent task C will run on line No. 3 from column 1 call MOVE_CONCUR (parameters of concurrent task C)

End CONCURRENT_C_TASK

CONCURRENT_D_TASK task priority 7

Concurrent task D will run on line No. 4 from column 1 call MOVE_CONCUR (parameters of concurrent task D)

End CONCURRENT_D_TASK

CONCURRENT_E_TASK task priority 9

Concurrent task E will run on line No. 5 from column 1 call MOVE_CONCUR (parameters of concurrent task E)

End CONCURRENT_E_TASK

CONCURRENT_F_TASK task priority 12

Concurrent task F will run on line No. 6 from column 1 call MOVE_CONCUR (parameters of concurrent task F)

End CONCURRENT_F_TASK

CONCURRENT_G_TASK task priority 14

Concurrent task G will run on line No. 7 from column 1 call MOVE_CONCUR (parameters of concurrent task G)

End CONCURRENT_G_TASK

CONCURRENT_H_TASK task priority 16

Concurrent task H will run on line No. 8 from column 1 call MOVE_CONCUR (parameters of concurrent task

H)
End CONCURRENT_H_TASK
CONCURRENT_I_TASK task priority 18
Concurrent task I will run on line No. 9 from column 1
call MOVE_CONCUR (parameters of concurrent task I)
End CONCURRENT_I_TASK
CONCURRENT_J_TASK task priority 20
Concurrent task J will run on line No. 10 from column 1
call MOVE_CONCUR (parameters of concurrent task J)
End CONCURRENT_J_TASK
CONCURRENT_K_TASK task priority 2
Concurrent task K will run on line No. 12 from column 1
call MOVE_CONCUR (parameters of concurrent task K)
End CONCURRENT_K_TASK
CONCURRENT_L_TASK task priority 4
Concurrent task L will run on line No. 13 from column 1
call MOVE_CONCUR (parameters of concurrent task L)
End CONCURRENT_L_TASK
CONCURRENT_M_TASK task priority 6
Concurrent task M will run on line No. 14 from column 1
call MOVE_CONCUR (parameters of concurrent task M)
End CONCURRENT_M_TASK
CONCURRENT_N_TASK task priority 8
Concurrent task N will run on line No. 15 from column 1
call MOVE_CONCUR (parameters of concurrent task N)
End CONCURRENT_N_TASK
CONCURRENT_O_TASK task priority 10
Concurrent task O will run on line No. 16 from column 1
call MOVE_CONCUR (parameters of concurrent task O)
End CONCURRENT_O_TASK
CONCURRENT_P_TASK task priority 13
Concurrent task P will run on line No. 17 from column 1
call MOVE_CONCUR (parameters of concurrent task P)
End CONCURRENT_P_TASK
CONCURRENT_Q_TASK task priority 15
Concurrent task Q will run on line No. 18 from column 1
call MOVE_CONCUR (parameters of concurrent task Q)
End CONCURRENT_Q_TASK
CONCURRENT_R_TASK task priority 17
Concurrent task R will run on line No. 19 from column 1
call MOVE_CONCUR (parameters of concurrent task R)
End CONCURRENT_R_TASK
CONCURRENT_S_TASK task priority 19
Concurrent task S will run on line No. 20 from column 1
call MOVE_CONCUR (parameters of concurrent task S)
End CONCURRENT_S_TASK
CONCURRENT_T_TASK task priority 21
Concurrent task T will run on line No. 21 from column 1
call MOVE_CONCUR (parameters of concurrent task T)
End CONCURRENT_T_TASK
MOVE_CONCUR procedure (parameters of a concurrent task)
Display the designation of the concurrent task in question on its line in column 1)
Repeat
Select a random number between 1 and 6
Case 1: call TEST_EVENT primitive (SPEED_EV) to know the speed status
If fast then call STEP (fast and no bonus)
If slow then call STEP (slow and no bonus)
Case 2: call TEST_EVENT primitive (SPEED_EV) to know the speed status
If fast then call STEP (fast and no bonus)
If slow then do nothing
Case 3: call TEST_EVENT primitive (SPEED_EV) to know status
If fast then call STEP (fast and bonus)
If slow then do nothing
Case 4: call WAIT_EVENT primitive (CONCUR_EV) to await its private event
Case 5: call WAIT_EVENT primitive (DRIVER_EV) to await the common event
Case 6: call WAIT_DELAY primitive to await a delay randomly selected between 0 and 100 ms
End of Cases
Until the concurrent task is in column 77
call DISPLAY_RANK to display its rank
call AT_END to inscribe at arrival
call END_TASK primitive to complete the concurrent task in process
End MOVE_CONCUR
STEP procedure (speed and bonus)
If the concurrent task is facing an obstacle ("[") then
If it benefits from a bonus then
call TEST_AND_RESERVE primitive (GATE_RES) to attempt to reserve the obstacle resource
If the resource is busy (it is not reserved), then completely jump the obstacle
End If
Else
call RESERVE primitive (GATE_RES) to reserve the obstacle resource
End If
Else If the concurrent task is at the end of the obstacle ("]") then
call FREE primitive (GATE_RES) to free the obstacle resource
End If
Advance the concurrent task one column
If speed is fast then
Display the letter identifying the concurrent task in capitals on its line and column
Else
Display the letter identifying the concurrent task in small letters on its line and column
End If
End STEP
DISPLAY_RANK procedure
call TEST_AND_RECEIVE primitive (RANK_BOX) to try to receive a message containing a rank
If a message has been received then
Display the rank in column 79 of the line of the concurrent task
End If
End DISPLAY_RANK
AT_END procedure
Prepare the message giving the identification of the concurrent task
call SEND primitive (AT_END_BOX) to send the message
End AT_END
DISPLAY_TASK task priority 22
Initialize the screen peripheral (speed, parity, etc.)
Clear screen
Repeat
call RECEIVE primitive (DISPLAY_BOX) in order to use the message received Position the cursor on the screen on the specified line and column Write on the screen depending on the type of value specified:

Case of character: Display the character

Case of a chain of characters: Display the chain of characters

Case of integer: Display the integer etc.

End of Cases

Indefinitely

End DISPLAY_TASK

SPEED_TASK task priority 0 call TEST_EVENT primitive (SPEED_EV) to test the status of the event

If the event has occurred, which corresponds to the slow speed, then call RESET_EVENT primitive (SPEED_EV) to set it to non-occurred call DISPLAY_SPEED (fast)

Else it is at fast speed call SET_EVENT primitive (SPEED_EV) to set it at occurred call DISPLAY_SPEED (slow)

End If

End SPEED_TASK

DISPLAY_SPEED procedure (speed)

prepare the message to be displayed on line 24, column 20

If the speed is slow then the message is "slow" in small letters

Else the message is "FAST" in capital letters

End If call TEST_AND_SEND primitive (DISPLAY_BOX) to send the message

End DISPLAY_SPEED

RANDOM_TASK task priority 11

Initialize the pseudo-random number generator

Repeat

Calculate a random number and store it in the message call SEND primitive (RANDOM_BOX) to send a message Indefinitely End RANDOM_TASK The progression of the concurrent tasks can be visualized on the screen according to the representation mode illustrated by FIGS. 1 to 4 in which:

—the common route of the concurrent tasks is represented by a horizontal line in dashes (each segment indicating a progression of one step) and the obstacles are indicated by spaces between brackets that can comprise one or more steps depending on their importance;

—each concurrent task is represented by a letter (in capitals in the first state of the cyclical task and in small letters in the second state of the cyclical task) which moves parallel with the common route, the progression of this task being indicated in the form of a histogram;

—the concurrent tasks are divided into two groups (from A to J and from K to T) respectively placed above and below the common route;

—useful indications such as e.g. the number of the operation phase, the status imposed by the cyclical task, the total time of the operation phase, and the average time of the operation phases previously executed (windows 11, 12, 13, 14);

—the numbers 1, 2, 3 situated in the right-hand margin 15 (FIGS. 3 and 4) designate the first three concurrent tasks in the order of arrival. Finally, only the first four concurrent tasks are signalled in this window, this parameter being adjustable.

Figure 2:
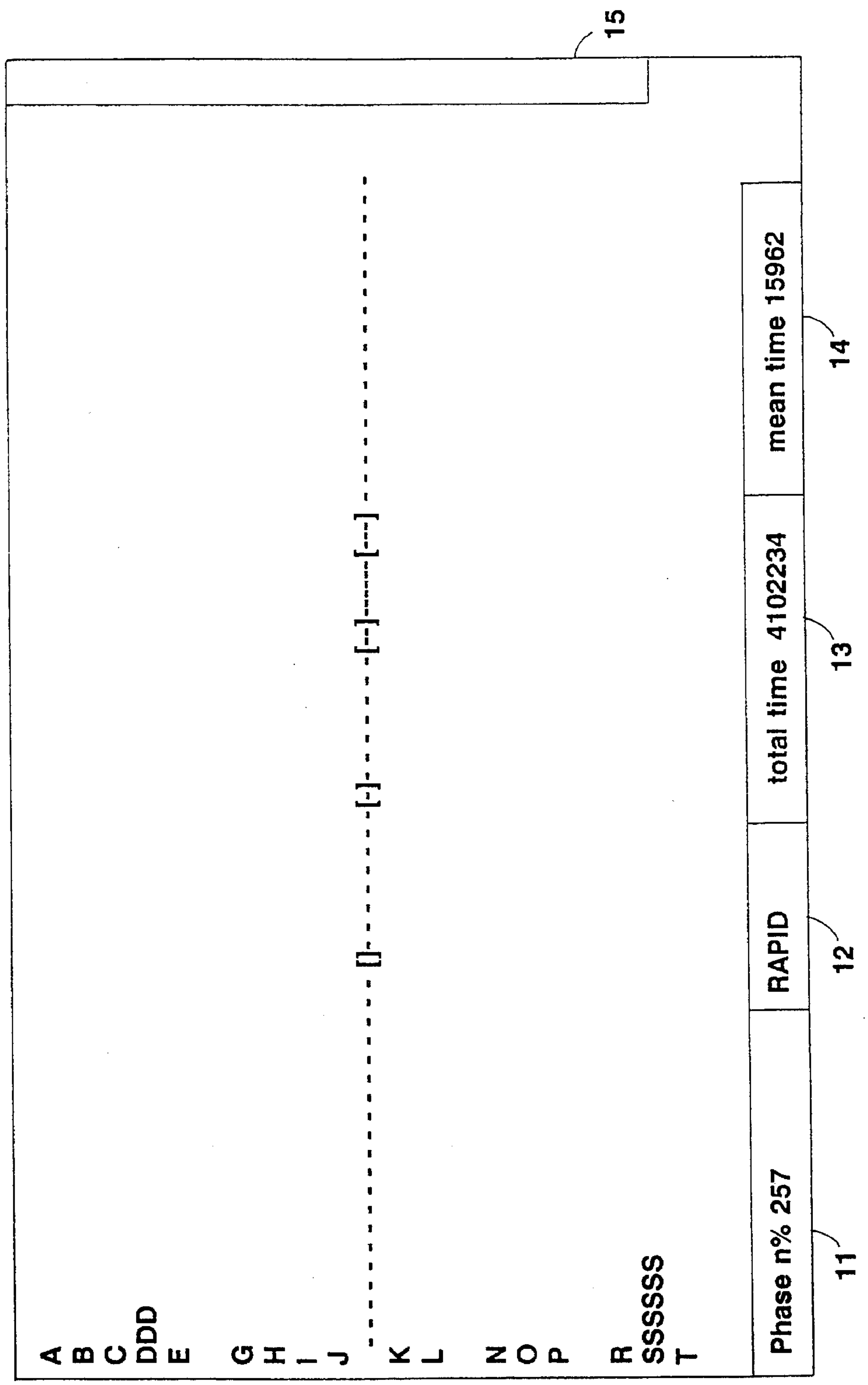

In the instant preceding the start of an operation phase, only the route is represented on the screen (FIG. 1). At the moment of departure, the concurrent tasks appear on a vertical starting line as indicated in FIG. 2 where only tasks D and S have begun their progression. FIG. 3 shows the respective positions of the tasks in the middle of the operation phase, tasks N, D, O having arrived in that order at the end of the route.

At the end of the operation phase, all the concurrent tasks have arrived at the end of the route (FIG. 4).

The invention is not, of course, limited to this mode of representation.

I claim:

1. A method for testing a set of primitives of a real-time executive, said set of primitives comprising synchronization and resource-sharing primitives, said set of primitives enabling a machine to execute several tasks asynchronously and in an apparent simultaneity, said machine having resources comprising a processor designed to execute just one task at a time, each task using for its execution all resources of the machine, said method using a plurality of cooperating tasks, said plurality of cooperating tasks comprising:

(a) a set of concurrent tasks, based on a same model and only differing from one another by way of a respective static context, said static context comprising a task designation and a task priority, each of these concurrent tasks performing a randomly determined operating sequence comprising actions making said task progress and actions putting said task in standby, said actions using said primitives;

(b) a driver task which, by means of said primitives, controls execution of said concurrent tasks by regulating launching of said concurrent tasks, by activating progress of said concurrent tasks and by detecting completion thereof; and (c) at least one resource server task supplying said cooperating tasks with accesses to a resource of said machine;

said method comprising successively:

(1) determining respective priorities of said tasks, so as to spread running of said tasks over a time period and so as to create a maximum number of different cases of task changes, (2) a prior phase comprising the steps of:

initializing a real-time clock, launching said driver task, creating a set of necessary real-time objects, and launching the resource server tasks, (3) successive operation phases controlled by said driver task according to a same operating sequence, each of said operation phases comprising the steps of:

randomly selecting a launching mode of said concurrent tasks, from among different predetermined launching modes, launching said concurrent tasks according to said selected launching mode, by means of randomly selected primitives, in a randomly determined order, each of said tasks randomly determining said sequence of actions once they are launched, freeing said concurrent tasks from a respective standby status, either by expiry of delays blocking them, or by random selection of public or private event numbers which free said concurrent tasks awaiting these events, detecting completion of each of said concurrent tasks, taking into account and memorizing characteristic parameters of the operation phase that has just taken place, modifying an order in which the concurrent tasks will be relaunched during a following operation phase, launching said following operation phase, analyzing said characteristic parameters during and upon completion of said operation phases so as to provide a test result of said set of primitives.

2. The method as claimed in claim 1, wherein said different predetermined launching modes comprise:

immediate unconditional launching, launching deferred on standby for an event, launching deferred on standby for a delay which is itself random.

3. The method as claimed in claim 1, said plurality of cooperating tasks further comprises at least one external resource server task, an internal resource server task, and a cyclical task.

4. The method as claimed in claim 3, wherein said external resource server task is a screen management task, said internal resource server task is a distributor of random numbers used by said concurrent tasks, and said cyclical task periodically imposes conditions that influence said operating sequence of said concurrent tasks during said operation phases.

5. The method as claimed in claim 3, wherein said cooperating tasks are ranked according to their priority and in ascending order as follows:

the driver task which is the background task, the external resource server task, the concurrent tasks which are divided into several levels of ascending priority, the internal resource server task, and the cyclical task.

6. The method as claimed in claim 3, wherein said external resource server task receives requests from the cooperating tasks requesting an external resource in the form of messages describing the type of input/output required for the requesting task, said messages being disposed in a first mailbox which, when full, causes a blocking of said requesting tasks which remain on standby to be able to deposit their message and continue, and wherein if said first mailbox is empty, said external resource server task is blocked while awaiting to receive a new message.

7. The method as claimed in claim 3, wherein said external resource server task completely processes a request before taking the following request into account, irrespective of the priority of the requesting tasks.

8. The method as claimed in claim 3, wherein said internal resource server task consists in a random number distributor task depositing random numbers in a second mailbox, wherein cooperating tasks requesting a random number set themselves to reception on said second mailbox, wherein if said second mailbox is empty, said requesting tasks are blocked while awaiting to be able to extract a number and continue execution, and wherein, when said second mailbox is full, said distributor task blocks while awaiting to be able to deposit a new number.

9. The method as claimed in claim 3, wherein said cyclical task uses an event which it triggers at each new cycle, said cyclical task using:

a first primitive to know what state said event is in, a second primitive to set said event to the occurred state, and a third primitive to set said event to the non-occurred state.

10. The method as claimed in claim 1, wherein execution of each of said concurrent tasks encounters common obstacles managed as a non-sharable resource, each of said obstacles can only be overcome by one concurrent task at a time, and wherein upon arrival at an obstacle, each concurrent task requests access to the corresponding resource by means of a first primitive and at the end of said obstacle frees the resource it was occupying, by means of a second primitive.

11. The method as claimed in claim 10, wherein a concurrent task may overcome a busy obstacle without waiting for it to be freed, further to randomly obtaining a bonus, when said cyclical task displays a given status.

12. The method as claimed in claim 10, wherein at completion, each concurrent task inscribes its designation in a register which is permanently consulted by said driver task for detecting the end of an operation phase, so as to relaunch a new one.

13. The method as claimed in claim 1, wherein leading concurrent tasks are ranked by order of arrival by said driver task, whereas no distinction is made between trailing concurrent tasks.

* * * * *